Figure 1:
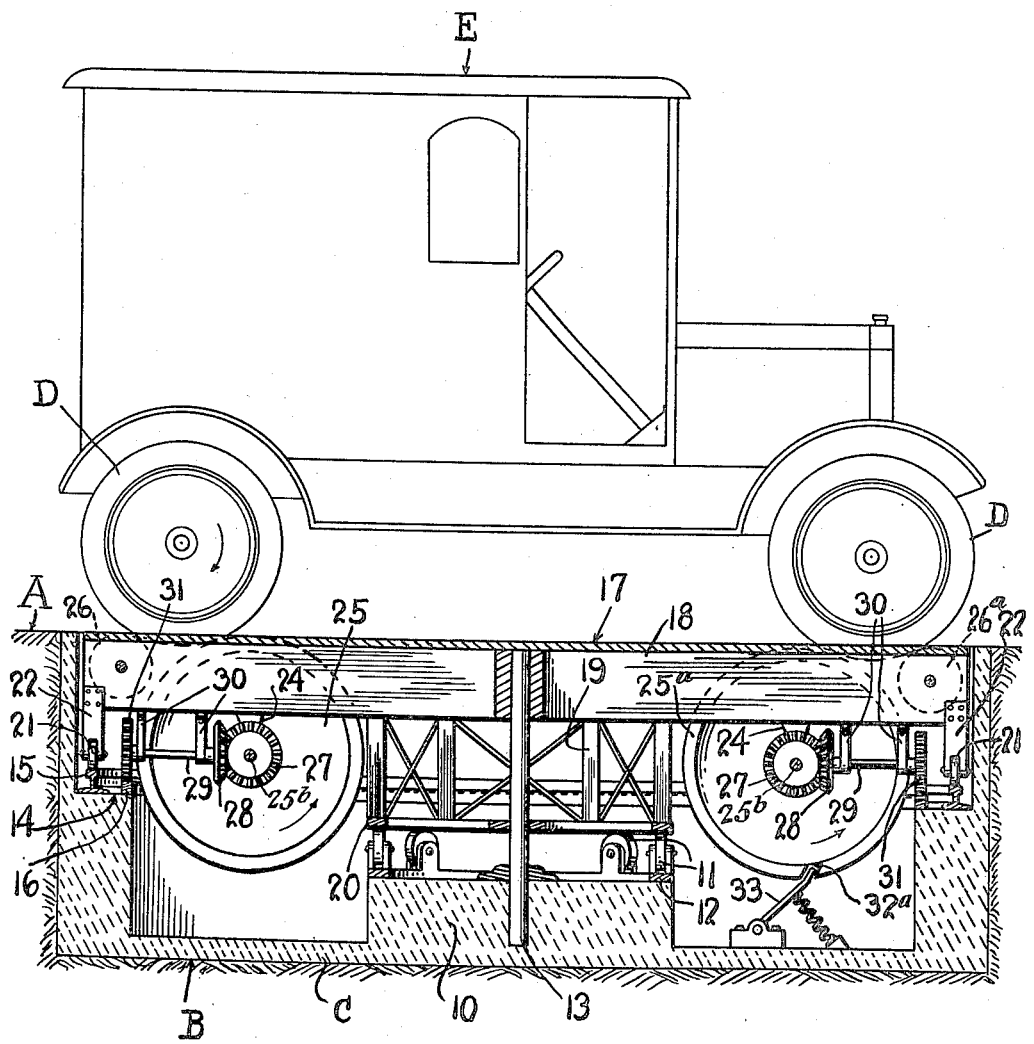

T. E. IMLER.
AUTOMOBILE TURNTABLE.
APPLICATION FILED MAY 24, 1920.

1,417,384. Patented May 23, 1922.
3 SHEETS—SHEET 1.

WITNESS:
L. B. James
J. M. Jester

Thomas E. Imler
INVENTOR
BY Victor J. Evans
ATTORNEY

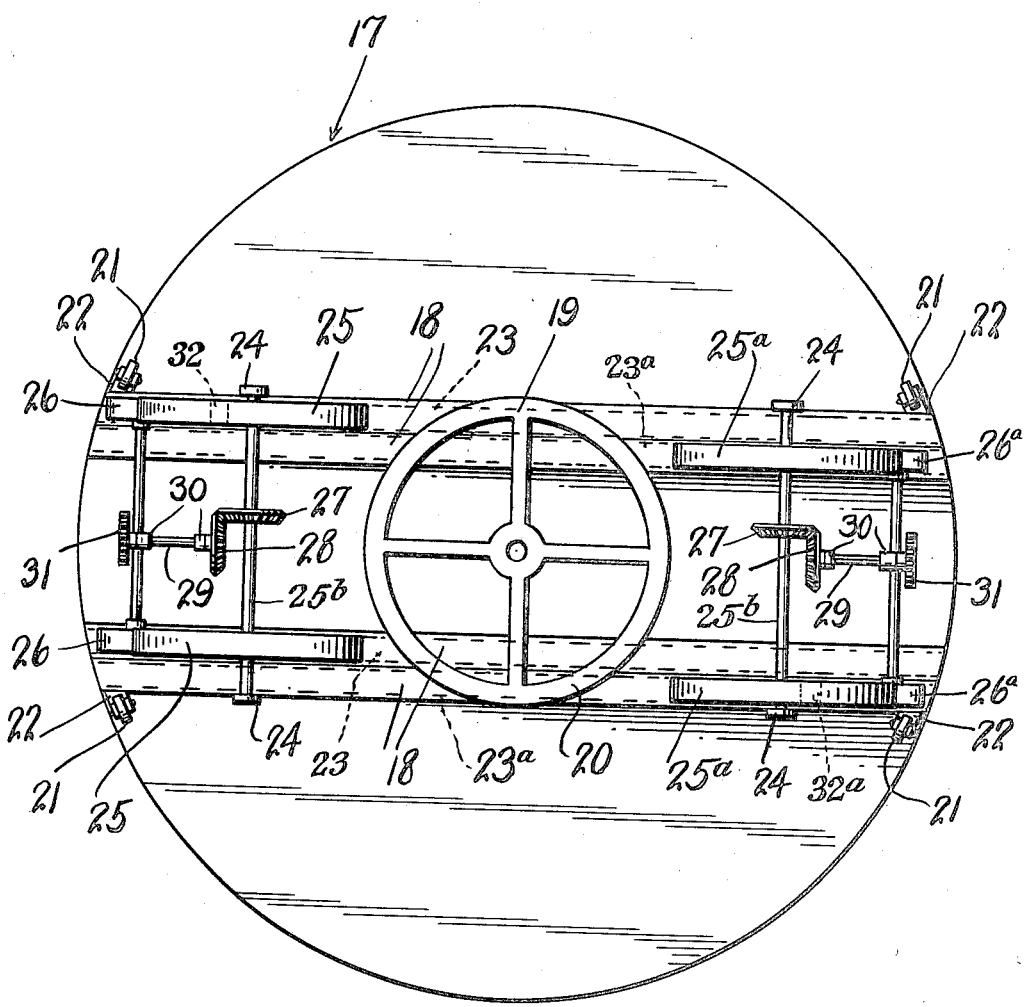

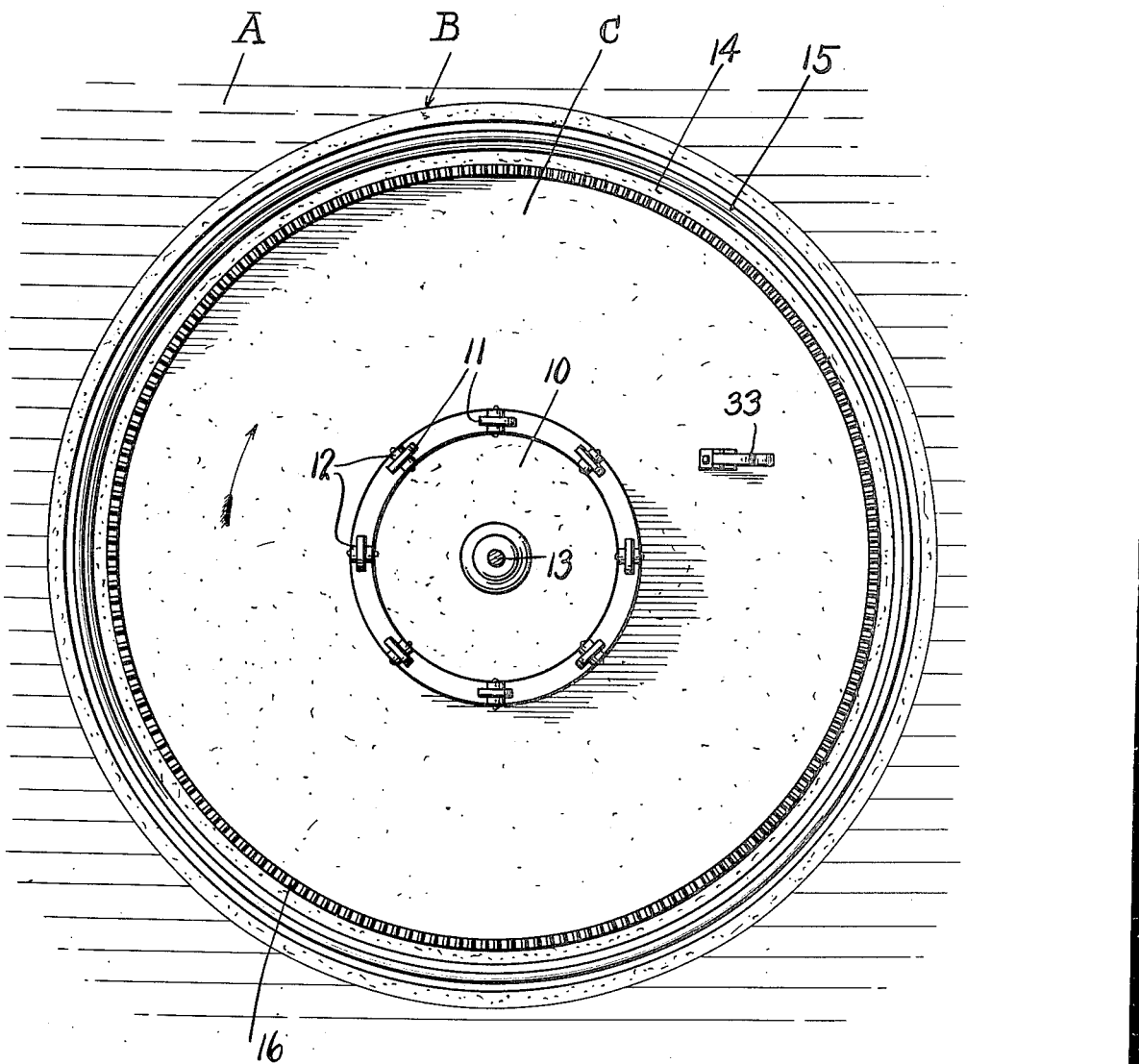

UNITED STATES PATENT OFFICE.

THOMAS E. IMLER, OF SALINA, KANSAS.

AUTOMOBILE TURNTABLE.

1,417,384.             Specification of Letters Patent.    Patented May 23, 1922.

Application filed May 24, 1920. Serial No. 383,937.

*To all whom it may concern:*

Be it known that I, THOMAS E. IMLER, a citizen of the United States, residing at Salina, in the county of Saline and State of Kansas, have invented new and useful Improvements in Automobile Turntables, of which the following is a specification.

This invention relates to turn-tables and has for its object the provision of a turn-table adapted to be disposed within a driveway within a garage or the like, and which is so constructed that when an automobile is driven thereonto and run upon low speed forward the back wheels of the automobile will operate to drive the turn-table for turning the automobile around so that it will face toward the front of the garage ready to be driven out in the ordinary manner, the device having the great advantage of obviating the necessity for backing out through a long narrow driveway.

An important object is the provision of a device of this character which is so constructed that the operation is effected entirely through the motion of the rear wheels of the automobile, the wheels when rotating in a forward or normal direction operating to turn the turn-table, and the turn-table automatically locking after being turned half way around so that as the wheels are rotated and continued to be driven in the same direction the turn-table will become inactive so that the automobile will be driven thereoff.

Another object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a longitudinal sectional view through my device showing an automobile in operative position thereon, Figure 2 is a bottom plan view of the turntable, and Figure 3 is a plan view of the pit and the structure therein with the turn-table platform removed.

Referring more particularly to the drawings, the letter A designates a driveway, B designates a pit therein, and C designates a concrete foundation including a bottom and walls having a cylindrical inner surface.

Formed upon the cement foundation C is a central cylindrical upstanding projection 10 upon which are mounted at spaced intervals rollers 11 journaled in suitable brackets 12 and arranged in circumferential series. Projecting upwardly from the center of the projection 10 is a shaft 13. Also rising from the base or foundation C is a flange 14 carrying upon its top a circular track 15 and also a circular rack or gear 16. This represents the stationary portion of the device.

Disposed within the pit B is a turn-table structure including a platform 17 which substantially fills the pit and which is located at the upper portion thereof practically flush with the surface of the driveway A. The platform includes suitable stringers 18 and an under-structure 19 rotatable upon the shaft or post 13 and this sub-structure is substantially cylindrical in form and carries a ring 20 bearing upon the rollers 11 for partially supporting the turn-table. At its outer periphery the turn-table carries a plurality of rollers 21 journaled in suitable brackets 22 and traveling upon the circular rail 15 and this completes the support for the turn-table proper. The top of the turn-table is formed with pairs of grooves 23 and 23ª serving as tracks for wheels D of an automobile E driven thereonto.

Depending from the stringers at diametrically opposite points are suitable brackets 24 between which are journaled wheels 25 and 25ª which extend within the trackways or grooves 23 and 23ª respectively. Also journaled between the stringers are rollers 26 and 26ª likewise disposed within the trackways and these rollers are spaced slightly from the wheels 25 and 25ª, respectively, to provide depressions within which are received the rear wheels of the automobile driven onto the turn-table.

The shaft 25ᵇ of each pair of wheels carries a bevel gear 27 meshing with a bevel gear 28 secured upon a shaft 29 journaled in bearing brackets 30 and carrying upon its other end a spur gear 31 meshing with the circular rack 16.

The diagonally opposite wheels 25 and 25ª are formed in their peripheries with inclined notches or slots 32 and 32ª, respectively, and these slots are adapted to be engaged upon a spring pressed pawl 33 which is carried upon the cement foundation at the portion thereof most remote from the garage door.

The operation of the device is as follows:

The device being in normal position, as shown in the drawings, the automobile E to be turned is driven along the drive-way A onto the turn-table or platform 17, the wheels passing along within the pair of grooves or track-ways 23. As the automobile is driven onto the turn-table and the rear wheels pass over the rollers 26 that are at the entrance end, the rear wheels will drop slightly between these rollers 26 and the adjacent wheels 25. When the operator of the automobile then shifts his gears into low speed, and lets in the clutch, the frictional engagement of the rear tires with the rollers 26 and wheels 25 will cause rotation of the wheels 25 and consequent driving of the shaft 29. As the shaft 29 is thus rotated it will drive the spur gear 31 and as this spur gear meshes with the ring gear or circular rack 16 the turn-table will be turned in a clockwise direction, as indicated by the arrow in Figure 3. The number of teeth in the gears is so arranged or related that when the wheels 25 have been turned the necessary amount to turn the turn-table a half revolution, the notch or recess 32 in the driven wheel 25 will be engaged by the pawl 33 and further rotation of the wheels 25 will be prevented. The trackways or grooves 23 in the turn-table will then be in proper position and the automobile will be driven in a forward direction onto the drive-way A.

When the platform has been thus turned it is apparent that the wheels 25 will be the farthest away from the garage door while the wheels 25ª in the trackways 23ª will be nearest the door. In the first described instance the operator drove the machine along the trackways 23. After the platform has been turned as above described and the machine is again driven into the garage it is driven this time along the trackways 23ª so that the rear wheels of the vehicle will engage the wheels 25ª and rollers 26ª. When the car is then put in low gear forward and the clutch let in the rotation of the wheels 25ª will cause rotation of the associated bevel gear 27 and consequently the associated gear 31 which, being in mesh with the circular rack, will cause the platform to be rotated in a counter clockwise direction through an arc of 180 degrees back to the original position as disclosed in Figure 1. After the platform has been turned from the position shown in Figure 1 to a position exactly opposite, that is through an arc of 180 degrees, the pawl 33 is of course engaged within the notch 32ª. However, when the machine is driven onto the trackways 23ª, as above mentioned, for driving the wheels 25ª, it will be apparent that owing to the specific arrangement of the gears, the wheels 25 will be rotated in a counter clockwise direction so that the notch 32 will ride idly out of engagement with the pawl 33, the unlocking action of the pawl being thus automatic. This automatic action would not occur except that two sets of trackways and two sets of drive wheels are provided and except for the provision of the specific gear arrangement which causes both sets of wheels 25 and 25ª to rotate in same direction. It is to be noted that the platform never makes a complete revolution, that is to say it turns half way in a clockwise direction and then in a counter clockwise direction back to its original position.

From the foregoing description and a study of the drawings, it will be apparent that I have thus provided a comparatively simple turn-table device which may be installed in a garage at comparatively low cost and which will efficiently turn an automobile by the automobile's own power so that the automobile may be faced toward the front of the garage in order to obviate any necessity whatever for backing out through a long narrow drive-way.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described, comprising a circular pit formed within a driveway, a central upstanding projection within the pit, a shaft rising therefrom, a circular ring on said projection, a flange formed at the periphery of the pit, a circular rack on said flange, a turn-table including a platform rotatable upon said shaft, a sub-structure carried by the platform, rollers on said sub-structure traveling on said ring, said platform being provided with parallel guides adapted to receive the wheels of a motor vehicle, a shaft journaled beneath the platform at the ends of said guides at each side thereof, wheels secured upon said shafts and extending within said guides, a gear carried by each of said last named shafts, counter-shafts journaled beneath the platform at opposite sides thereof, gears on said counter shafts meshing with said first named gears, and gears on said counter-shafts meshing with said circular rack.

2. A device of the character described comprising a circular pit formed within a driveway, a central upstanding projection within the pit, a shaft rising therefrom, a circular ring on said projection, a flange formed at the periphery of the pit, a circular rack on said flange, a turn-table including a platform rotatable upon said shaft, a sub-structure carried by the platform, rollers on said sub-structure traveling on said ring, said platform being provided with parallel guides adapted to receive the wheels of a motor vehicle, a shaft journaled beneath the platform at the ends of said guides at each side thereof, wheels secured upon said shafts and extending within said guides, a gear carried by each of said last named shafts, counter-shafts journaled beneath the platform at opposite sides thereof, gears on said counter-shafts meshing with said first named gears, gears on said counter-shafts meshing with said circular rack, and rollers journaled at opposite sides of the platform in spaced relation to said wheels and defining therewith depressions adapted to receive the rear wheels of the motor vehicle.

3. A device of the character described comprising a circular pit formed within a driveway, a central upstanding projection within the pit, a shaft rising therefrom, a circular ring on said projection, a flange formed at the periphery of the pit, a circular rack on said flange, a turn-table including a platform rotatable upon said shaft, a sub-structure carried by the platform, rollers on said sub-structure traveling on said ring, said platform being provided with parallel guides adapted to receive the wheels of a motor vehicle, a shaft journaled beneath the platform at the ends of said guides at each side thereof, wheels secured upon said shafts and extending within said guides, a gear carried by each of said last named shafts, counter-shafts journaled beneath the platform at opposite sides thereof, gears on said counter-shafts meshing with said first named gears, gears on said counter-shafts meshing with said circular rack, rollers journaled at opposite sides of the platform in spaced relation to said wheels and defining therewith depressions adapted to receive the rear wheels of the motor vehicle, and means automatically operating to lock said wheels against rotation in one direction when said platform has been turned through an arc of 180°.

4. A device of the character described comprising a circular pit formed within a driveway, a central upstanding projection within the pit, a shaft rising therefrom, a circular ring on said projection, a flange formed at the periphery of the pit, a circular rack on said flange, a turn-table including a platform rotatable upon said shaft, a sub-structure carried by the platform, rollers on said sub-structure traveling on said ring, said platform being provided with parallel guides adapted to receive the wheels of a motor vehicle, a shaft journaled beneath the platform at the ends of said guides at each side thereof, wheels secured upon said shafts, and extending within said guides, a gear carried by each of said last named shafts, counter-shafts journaled beneath the platform at opposite sides thereof, gears on said counter-shafts meshing with said first named gears, gears on said counter-shafts meshing with said circular rack, rollers journaled at opposite sides of the platform in spaced relation to said wheels and defining therewith depressions adapted to receive the rear wheels of the motor vehicle, and means automatically operating to lock said wheels against rotation in one direction when said platform has been turned through an arc of 180° comprising spring-pressed pawls located in the bottom of the pit and engageable within inclined recesses in the peripheries of said wheels.

5. A device of the character described comprising a circular body formed within a drive-way, a turn-table including a platform rotatable within said body, guide means for the platform in its rotation, said platform being adapted to have an automobile driven thereonto and being formed with two pairs of guides for the wheels thereof, and separate means located within each pair of guides adapted to be engaged by the drive wheels of the automobile and rotated thereby and operatively connected with the turn-table whereby to effect corresponding movement thereof.

In testimony whereof I affix my signature.

THOMAS E. IMLER.